(12) United States Patent
Weber et al.

(10) Patent No.: US 11,208,062 B2
(45) Date of Patent: Dec. 28, 2021

(54) SYSTEMS AND METHODS FOR EXTENDING VEHICLE RANGE TO MAXIMIZE OPERATION DISTANCE

(71) Applicants: CUMMINS INC., Columbus, IN (US); AGILITY FUEL SYSTEMS, LLC, Costa Mesa, CA (US)

(72) Inventors: Gregory A. Weber, Greensburg, IN (US); Eric Coupal-Sikes, Santa Monica, CA (US); Todd F. Sloan, Kelowa (CA); Morgan M. Andreae, Columbus, IN (US); Jean-Patrick V. Rich, Nashville, IN (US)

(73) Assignees: CUMMINS INC., Columbus, IN (US); AGILITY FUEL SYSTEMS, LLC, Costa Mesa, CA (US)

( * ) Notice: Subject to any disclaimer, the term of this patent is extended or adjusted under 35 U.S.C. 154(b) by 72 days.

(21) Appl. No.: 15/966,556

(22) Filed: Apr. 30, 2018

(65) Prior Publication Data
US 2018/0312121 A1   Nov. 1, 2018

Related U.S. Application Data

(60) Provisional application No. 62/492,257, filed on Apr. 30, 2017.

(51) Int. Cl.
*B60R 16/023* (2006.01)
*B60W 30/182* (2020.01)

(52) U.S. Cl.
CPC ....... *B60R 16/0236* (2013.01); *B60W 30/182* (2013.01); *B60W 2400/00* (2013.01); *B60W 2510/244* (2013.01); *B60W 2530/209* (2020.02); *Y02T 10/84* (2013.01)

(58) Field of Classification Search
CPC .................................................. B60R 16/0236
See application file for complete search history.

(56) References Cited

U.S. PATENT DOCUMENTS

| | | | |
|---|---|---|---|
| 7,914,945 B2 * | 3/2011 | Dunn ................ | H01M 8/04089 429/515 |
| 8,972,162 B1 * | 3/2015 | Koebler ............. | B60L 15/2045 701/123 |
| 9,043,106 B2 * | 5/2015 | Ingram ................ | B64C 39/024 701/70 |
| 9,079,586 B2 * | 7/2015 | Crombez ............ | B60W 30/182 |
| 9,517,703 B1 * | 12/2016 | Liu .................... | B60H 1/00392 |

(Continued)

*Primary Examiner* — Michael A Berns
(74) *Attorney, Agent, or Firm* — Faegre, Drinker, Biddle & Reath

(57) ABSTRACT

Methods for extending a range of a vehicle are disclosed and include receiving a first data, the first data being indicative of a distance of the vehicle from a target destination, receiving a second data, the second data being indicative of a level of potential energy of an energy source for a power plant of the vehicle, receiving an operating parameter indicative of estimated future energy usage of the power plant, estimating, by a processor, an expected range of the vehicle based on the second data and the estimated future energy usage of the power plant, and adjusting a performance parameter of the power plant to extend an actual range of the vehicle when the estimated expected range is less than the distance of the vehicle from the target destination are disclosed. Systems for extending the range of the vehicle are also disclosed.

21 Claims, 5 Drawing Sheets

(56) References Cited

U.S. PATENT DOCUMENTS

| | | | | |
|---|---|---|---|---|
| 9,522,669 | B2* | 12/2016 | Engman | B60L 1/00 |
| 9,707,909 | B2* | 7/2017 | Weinberg | B60R 16/0236 |
| 9,878,631 | B2* | 1/2018 | Hyde | B60L 11/1861 |
| 9,969,275 | B2* | 5/2018 | Heyse | B60L 1/02 |
| 10,023,176 | B2* | 7/2018 | Tabanoglu | B60L 1/00 |
| 10,059,219 | B2* | 8/2018 | Qiu | B60K 6/40 |
| 10,118,603 | B2* | 11/2018 | Payne | G01C 21/3469 |
| 10,137,897 | B2* | 11/2018 | Higgins | B60W 30/182 |
| 10,234,302 | B2* | 3/2019 | Singhal | G01C 21/3602 |
| 10,377,389 | B2* | 8/2019 | Bryan | B60W 50/10 |
| 10,854,021 | B2* | 12/2020 | Weber | G01C 21/3469 |
| 10,865,732 | B2* | 12/2020 | Sloan | G01F 23/18 |
| 2005/0162122 | A1* | 7/2005 | Dunn | H01M 8/04089 |
| | | | | 320/101 |
| 2010/0138142 | A1* | 6/2010 | Pease | B60W 10/24 |
| | | | | 701/123 |
| 2011/0071712 | A1* | 3/2011 | Mizuno | B60W 10/08 |
| | | | | 701/22 |
| 2014/0214267 | A1* | 7/2014 | Sellschopp | G01C 21/3469 |
| | | | | 701/34.2 |
| 2018/0143035 | A1* | 5/2018 | Ricci | G01C 21/3461 |
| 2018/0312121 | A1* | 11/2018 | Weber | B60R 16/0236 |
| 2019/0283604 | A1* | 9/2019 | Koebler | B60L 50/62 |

* cited by examiner

SYSTEMS AND METHODS FOR EXTENDING VEHICLE RANGE TO MAXIMIZE OPERATION DISTANCE

RELATED APPLICATIONS

The present disclosure is related to and claims priority to U.S. Provisional Application No. 62/492,257, entitled "SYSTEMS AND METHODS FOR EXTENDING VEHICLE RANGE TO MAXIMIZE OPERATION DISTANCE," filed on Apr. 30, 2017, the entire disclosure of which is hereby expressly incorporated herein by reference.

FIELD OF THE DISCLOSURE

This disclosure relates systems for extending the range of a vehicle. More specifically, this disclosure relates to systems for extending the range of a vehicle when an estimated expected range is less than the distance of the vehicle from a target destination.

BACKGROUND

Vehicles are mobile machines that move people and/or cargo from one location to another. Due to varying intended uses, performance parameters, cost considerations, and evolving technology, vehicles—such as motor vehicles (e.g., cars, trucks, buses, etc.), watercraft (e.g., ships, boats, personal watercraft, etc.), and railed vehicles (e.g., trains, trams, etc.)—use various types of power plants to provide the motive force to move the vehicle. Power plants are machinery for supplying the power for a particular mechanical process, such as converting potential energy into mechanical energy to move the vehicle.

Power plants may include engines, motors, other power sources, and combinations thereof that may cooperate with related ignition, transmission, and other components of a vehicle. Engines may include compression-ignition engines (e.g., diesel engines), spark-ignition engines (e.g., gasoline engines, natural gas engines), gas turbines, jet engines, and combinations thereof. Motors can include electric motors or electric machines that convert electrical energy into mechanical energy, such as direct-current (DC) motors, alternating-current (AC) motors, and induction motors. Power plants may also include combinations of various types of engines and motors, such as conventional hybrid engines and flex fuel engines.

As the types of vehicles and their power plants become more diverse and rely on differing fuel (potential energy for the power plant such as chemical potential energy or stored electrical energy), not all target destinations, such as fueling stations or charging stations, may be able to resupply the vehicle being operated. Thus, operators of vehicles may find that they lack sufficient reserves to arrive at a target destination that has the proper fuel for the vehicle to resupply the reserve or tank.

Estimating the reserves of potential energy in a vehicle can become complicated by a variety of factors both internal and external of the vehicle. As fuel available at target destinations, such as fueling stations and/or charging stations, may vary and fuel for a particular power plant may be scarce along a route, operators may find that they do not have sufficient estimated fuel reserves to arrive at the next appropriate target destination.

A need therefore exists to address issues of extending the range of a vehicle when an estimated expected range is less than the distance of the vehicle from the target destination.

SUMMARY

In some embodiments, methods for extending a range of a vehicle may include receiving a first data, the first data being indicative of a distance of the vehicle from a target destination, receiving a second data, the second data being indicative of a level of potential energy of an energy source for a power plant of the vehicle, receiving an operating parameter indicative of estimated future energy usage of the power plant, estimating, by a processor, an expected range of the vehicle based on the second data and the estimated future energy usage of the power plant, and adjusting, by a controller in electrical communication with the power plant, a performance parameter of the power plant to extend an actual range of the vehicle when the estimated expected range is less than the distance of the vehicle from the target destination.

The level of potential energy is a level of a fuel or may be a state of charge of a battery or other electrical storage unit. The fuel may be at least one of an alcohol, a diesel fuel, a gasoline, a natural gas, hydrogen, propane, or mixtures thereof. Exemplary types of natural gas may be compressed natural gas, liquid natural gas, or mixtures thereof.

In various embodiments, the operating parameter includes at least one of torque, instantaneous power, idle limits, speed, acceleration, change of acceleration, or any combination thereof.

Various methods may also include instructing the controller, by the processor, to adjust the performance parameter. In some aspects, the processor may communicate wirelessly with the controller.

The first data may include at least one of a location of the vehicle, a location of the target destination, a velocity of the vehicle, an acceleration of the vehicle, a route from between the position of the vehicle and the target destination, an elevation change along the route, a surface condition of the route, or combinations thereof.

The estimated future energy usage of the power plant may include using or factoring in a third data, the third data including historical potential energy usage of the vehicle, historical potential energy usage of other vehicles, a weight of a payload, current traffic conditions, estimated future traffic conditions, current weather conditions, future weather conditions, or combinations thereof.

In various embodiments the target destination may be a fueling station or a charging station.

System for extending a range of a vehicle disclosed herein may include a controller in electrical communication with a power plant of the vehicle, an energy source that imparts potential energy into the power plant, a processor that receives a first data and a second data, the first data being indicative of a distance of the vehicle from a target destination, and the second data being indicative of a level of a potential energy of the energy source from a sensor that gauges the potential energy available for the power plant of the vehicle, wherein the processor estimates an expected range of the vehicle based on the second data and an operating condition of the vehicle, and when an estimated expected range of the vehicle from the target destination is less than the distance of the vehicle from the target destination indicated by the first data, the processor instructs a controller to adjust a performance parameter of the power plant to extend an actual range of the vehicle.

The power plant may be any power plant for a vehicle, such as an engine or electric motor. Engines include engines that convert at least one of alcohol, diesel fuel, gasoline, natural gas, or mixtures thereof into mechanical energy. Motors include various electric motors where the energy source is a battery.

In some systems, the processor wirelessly instructs the controller. In some embodiments, the processor may be in communication with a cloud that stores various data. For example, the first data is stored on a cloud.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The above mentioned and other features and objects of this disclosure, and the manner of attaining them, will become more apparent and the disclosure itself will be better understood by reference to the following description of exemplary embodiments of the disclosure taken in conjunction with the accompanying drawings, wherein.

Figure 1:
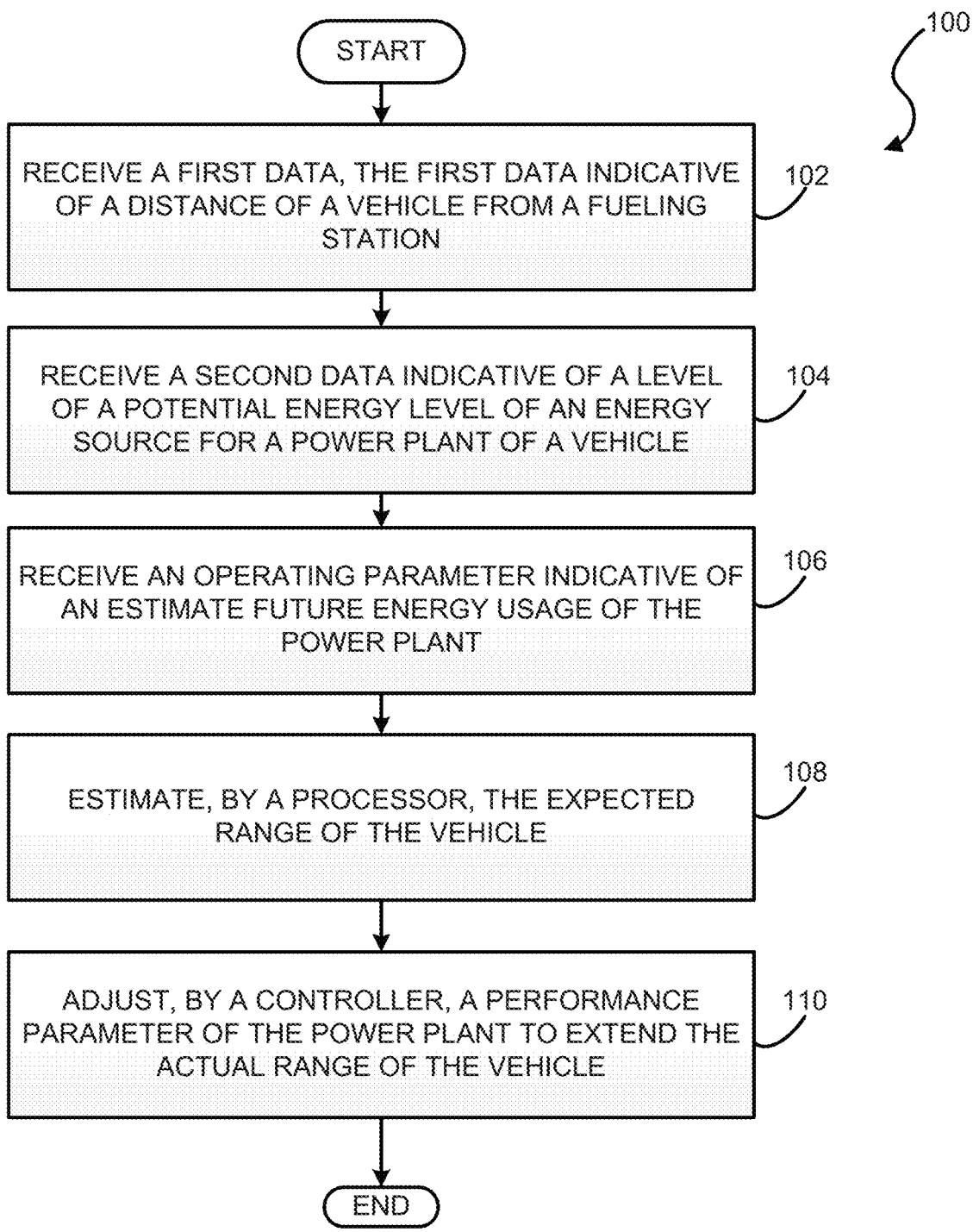
FIG. 1 shows a flow diagram for a method of extending a range of a vehicle.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates exemplary embodiments of the disclosure, in various forms, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize their teachings.

As described briefly above, as fuel available at target destinations may vary and fuel for a particular power plant for a vehicle may be scarce along a route, an operator may find that they do not have sufficient estimate fuel reserves to arrive at the next appropriate target destination. FIG. 1 illustrates such a method for extending the range of a vehicle when an estimated expected range is less than the distance of the vehicle from the target destination.

One of ordinary skill in the art will realize that the embodiments provided, such as those in the figures, including FIG. 1, can be implemented in various hardware, software, firmware, and/or combinations thereof. Programming code according to the various embodiments exemplified can be implemented in any viable programming language such as C, C++, HTML, XTML, JAVA or any other viable high-level programming language, or a combination of a high-level programming language and a lower level programming language.

FIG. 1 shows an exemplary flow diagram for a method for extending a range of a vehicle. Method 100 may include receiving a first data, the first data being indicative of a distance of the vehicle from a target destination (step 102) and receiving a second data, the second data being indicative of a level of potential energy of an energy source for a power plant of the vehicle (step 104).

The first data is not particularly limited and may include various types of data that may indicate or be used to indicate the distance of the vehicle from the target destination. Thus, as used herein, data that is "indicative of a distance of the vehicle from a target destination" may be data that contains the distance from the vehicle to the target destination or may be used by the vehicle in conjunction with other data for calculating the distance from the vehicle to the target destination.

For example, in some embodiments, the data may be the location of the target destination and other systems on the vehicle may calculate the actual distance from the vehicle to the target destination.

In other embodiments, the vehicle's location and the target destination's location may be calculated by a processor physically removed or separate from the vehicle. In such embodiments, a processor may calculate the distance of the vehicle from the target destination. The first data may then be sent to the vehicle via wireless technology or pulled by the vehicle via wireless technology, for example, from a cloud.

The first data indicative of a distance of the vehicle from a target destination may also include at least one of a location of the vehicle, a location of the target destination, a velocity of the vehicle, an acceleration of the vehicle, a route from between the position of the vehicle and the target destination, an elevation change along the route, a surface condition of the route, or combinations thereof.

As used herein, the term "wireless communication" is not particularly limited and may include any known method of wireless communication by computing devices, such as radio, infrared, microwave, wireless local area network, or Wi-Fi, or short-wavelength ultra-high frequency radio waves, such as Bluetooth.

The second data may be data that is indicative of a level of potential energy of an energy source for a power plant of the vehicle. The data is not particularly limited and may include any data for an energy source that is used by a vehicle. For example, with vehicles having internal combustion engines, sensors such as fuel or pressure sensors, may detect the remaining amount of fuel (potential energy) in the energy source (such as a fuel tank) and may send that data as the second data to the processor.

As used herein, the potential energy stored in the vehicle is not particularly limited and may vary based on the power plant or power plants used in the vehicle. For example, the potential energy may include electrical potential energy and/or chemical potential energy (e.g., gas). Thus, the level of potential energy may include the state of charge of a battery (for electrical potential energy) and/or include a fuel level or amount (for chemical potential energy). The fuel is not particularly limited and may include at least one of an alcohol, a diesel fuel, a gasoline, a natural gas (liquid or compressed natural gas), hydrogen, propane, other hydrocarbons, or mixtures thereof.

Method 100 may also include receiving an operating parameter indicative of estimated future energy usage of the power plant (step 106), estimating, by a processor, an expected range of the vehicle based on the second data and the estimated future energy usage of the power plant (step 108), and adjusting, by a controller in electrical communication with the power plant, a performance parameter of the power plant to extend an actual range of the vehicle when the estimated expected range is less than the distance of the vehicle from the target destination (step 110). In various embodiments, the target destination may be a fueling station and/or charging station to resupply the vehicle with either chemical potential energy (fuel) and/or electrical potential energy (supply electricity to recharge electrical storage units, such as batteries).

In some embodiments, the estimation of the expected range may include additional third data. Third data may help better inform the estimation of the range of the vehicle and may be data from the vehicle itself, data from other vehicles, data from the route, and/or environmental condition data. Third data may include historical potential energy usage of the vehicle, historical potential energy usage of other vehicles, a weight of a payload, current traffic conditions, estimated future traffic conditions, current weather conditions, future weather conditions, or combinations thereof.

The operating parameter is not particularly limited and may be received by a variety of sensors or other data that monitor the power plant. The operating parameter and performance parameters may include at least one of torque, instantaneous power, idle limits, speed, acceleration, change of acceleration, or any combination thereof. Thus, in some embodiments, methods may also include the step of instructing the controller, by the processor, to adjust the performance parameter. In some embodiments, the operating parameter may be the same parameter as a performance parameter, or in other embodiments, they may be different.

Figure 2:
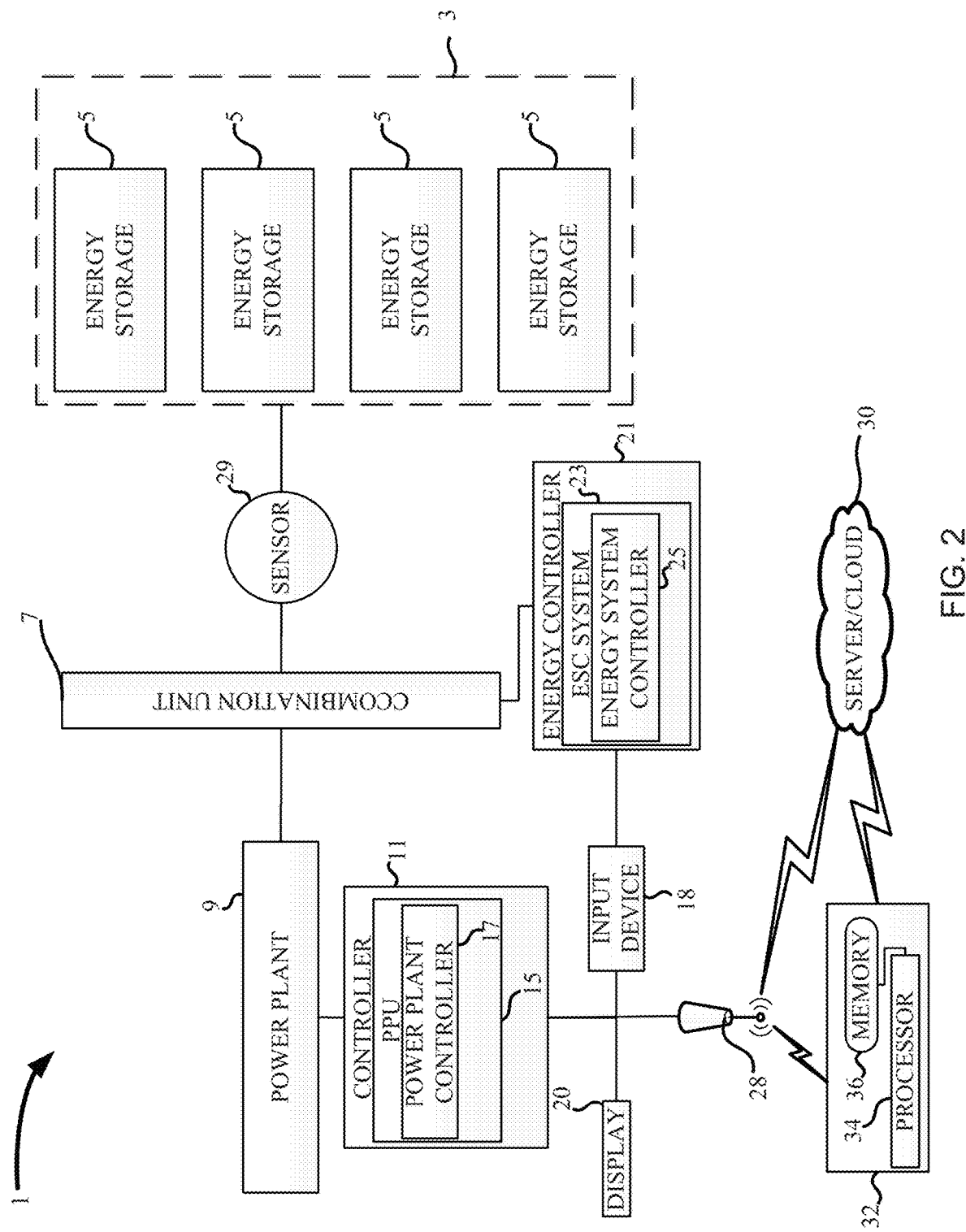
FIG. 2 illustrates a system for extending a range of a vehicle having a power plant, where a processor is in wireless communication with the power plant controller.
Figure 3:
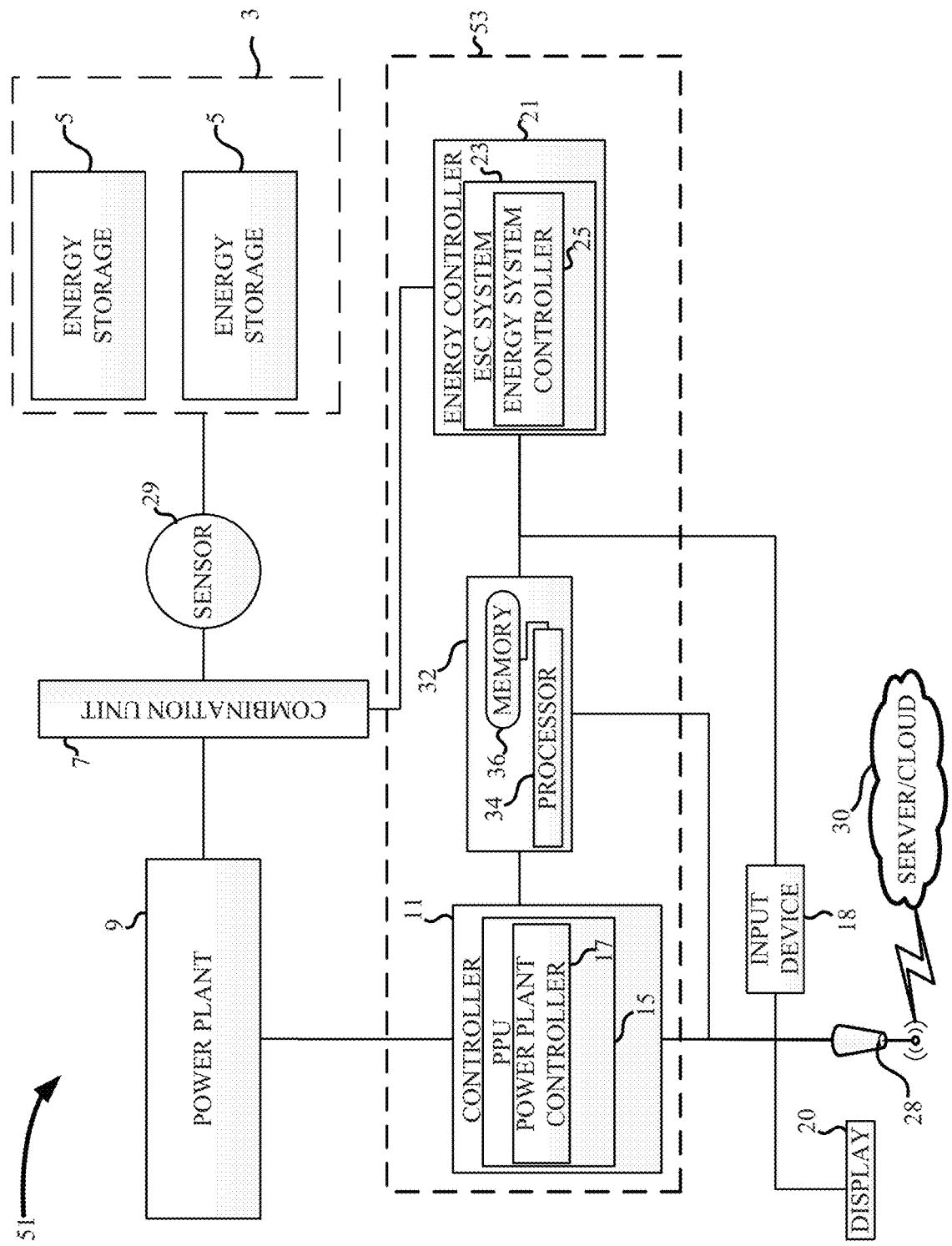
FIG. 3 illustrates a system for extending a range of a vehicle having a power plant, where a processor is in wired communication with the engine controller.

FIGS. 2 and 3 illustrate systems for extending a range of a vehicle. A person of ordinary skill will recognize that the various systems disclosed herein may be selected or modified to perform various embodiments disclosed herein on various types of vehicles.

Systems for extending a range of a vehicle disclosed herein may include a controller in electrical communication with a power plant of the vehicle, an energy source that imparts potential energy into the power plant, a processor that receives a first data and a second data, the first data being indicative of a distance of the vehicle from a target destination, and the second data being indicative of a level of a potential energy of the energy source from a sensor that gauges the potential energy available for the power plant of the vehicle, wherein the processor estimates an expected range of the vehicle based on the second data and an operating condition of the vehicle, and when an estimated expected range of the vehicle is less than the distance of the vehicle from the target destination indicated by the first data, the processor instructs a controller to adjust a performance parameter of the power plant to extend an actual range of the vehicle.

System 1 of FIG. 2 illustrates such as system and may include a power bank 3, which includes one or more energy storage units 3. Energy storage units 3 may be connected to sensor 29, which may be connected to combination unit 7. Energy (e.g., electrical or chemical) may then be supplied to power plant 9, which may be controlled by controller assembly 11, which may include a power plant control unit 15, which may include controller 17. Controller assembly 11 may include one or more interpreters, determiners, evaluators, regulators, processors, or combinations thereof that functionally execute the operations of the controller 17. The description herein including interpreters, determiners, evaluators, regulators, and/or processors emphasizes the structural independence of certain aspects of the controller 17 and illustrates one grouping of operations and responsibilities of the controller. Other groupings that execute similar overall operations are understood within the scope of the present application. Interpreters, determiners, evaluators, regulators, and/or processors may be implemented in hardware and/or as computer instructions on a non-transient computer readable storage medium, and may be distributed across various hardware or computer based components.

Examples and non-limiting implementation elements that functionally execute the operations of the controller include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Controller assembly 11 may be in electrical communication with display 20 and input device 18. Input device 18 may include a variety of devices used by an operator to control one or more parameters of the vehicle, including a brake, an accelerator, a steering mechanism, a gear shifter, and/or a governor or regulator.

Controller assembly 11 may also be connected to wireless communication device 28, such as a wireless bridge, which may be in wireless communication with a server or cloud 30, such as over a network or internet. As used herein the term "wireless bridge" may be understood to include a network bridge, which may be understood to include a computer networking device that creates a single aggregate network from multiple communication networks or network segments. Also, in the embodiment shown in FIG. 2, wireless communication device 28 may be in wireless communication with processing unit 32, which may include processor 34 and non-transitory memory 36. Thus, in some embodiments, the processor 34 may communicate wirelessly with controller 17 and/or instruct controller 17 wirelessly.

In the embodiment shown in FIG. 3, processing unit 32 may be in wired communication with controller assembly 11 and may send or receive data and information from server or cloud 30. As shown in FIG. 3, processing unit 32 may form part of vehicle computing system 53, which may also include energy controller assembly 21, which may include energy control system 23 and energy system controller 25. The energy control assembly 21 and energy control system 23 is not particularly limited and may vary depending on the power plant 9 of the vehicle, for example as shown in FIGS. 4 and 5.

Figure 4:
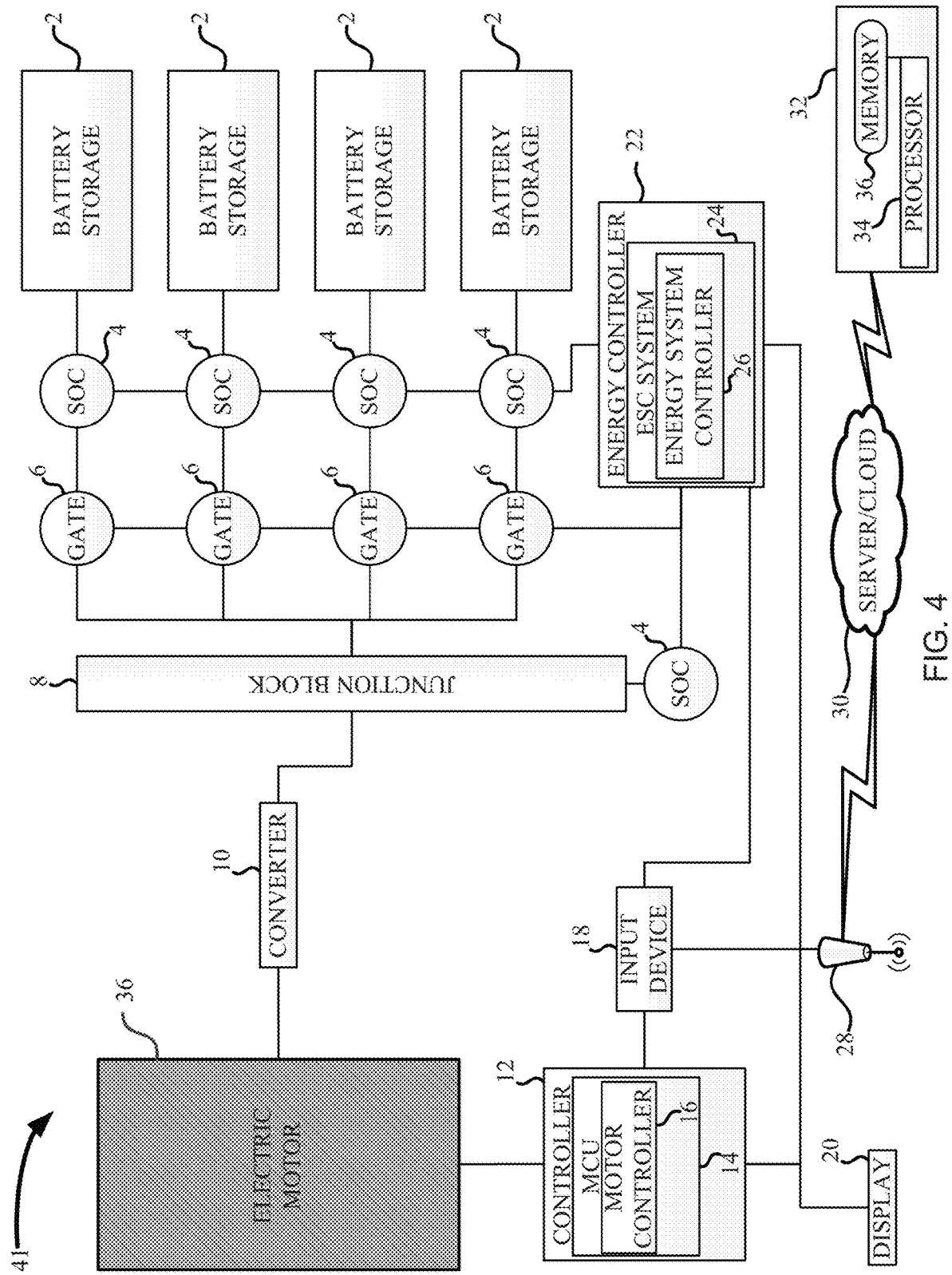
FIG. 4 illustrates a system where the power plant for the vehicle is an electric motor.

FIG. 4 illustrates control system 41 with an electric motor 36. In system 41, one or more battery 2 may be connected to a state of charge (SOC) sensor 4, which may be connected to one or more gates 6. Gates 6 may be connected to junction block 8, which may be connected to converter 10 to supply electric motor 36 with power. In the embodiment shown in FIG. 4, energy controller assembly 22 may include an energy system controller module or system 24, which may include energy system controller 26, which may monitor—for example with SOC sensors 4—and/or control the energy supplied by batteries 2 to electric motor 36.

Also illustrated in FIG. 4, is motor control assembly 12, which may include motor control unit 14, which may include motor controller 16 for controlling motor 36 based on a variety of factors, such as a demand input from input device 18.

Figure 5:
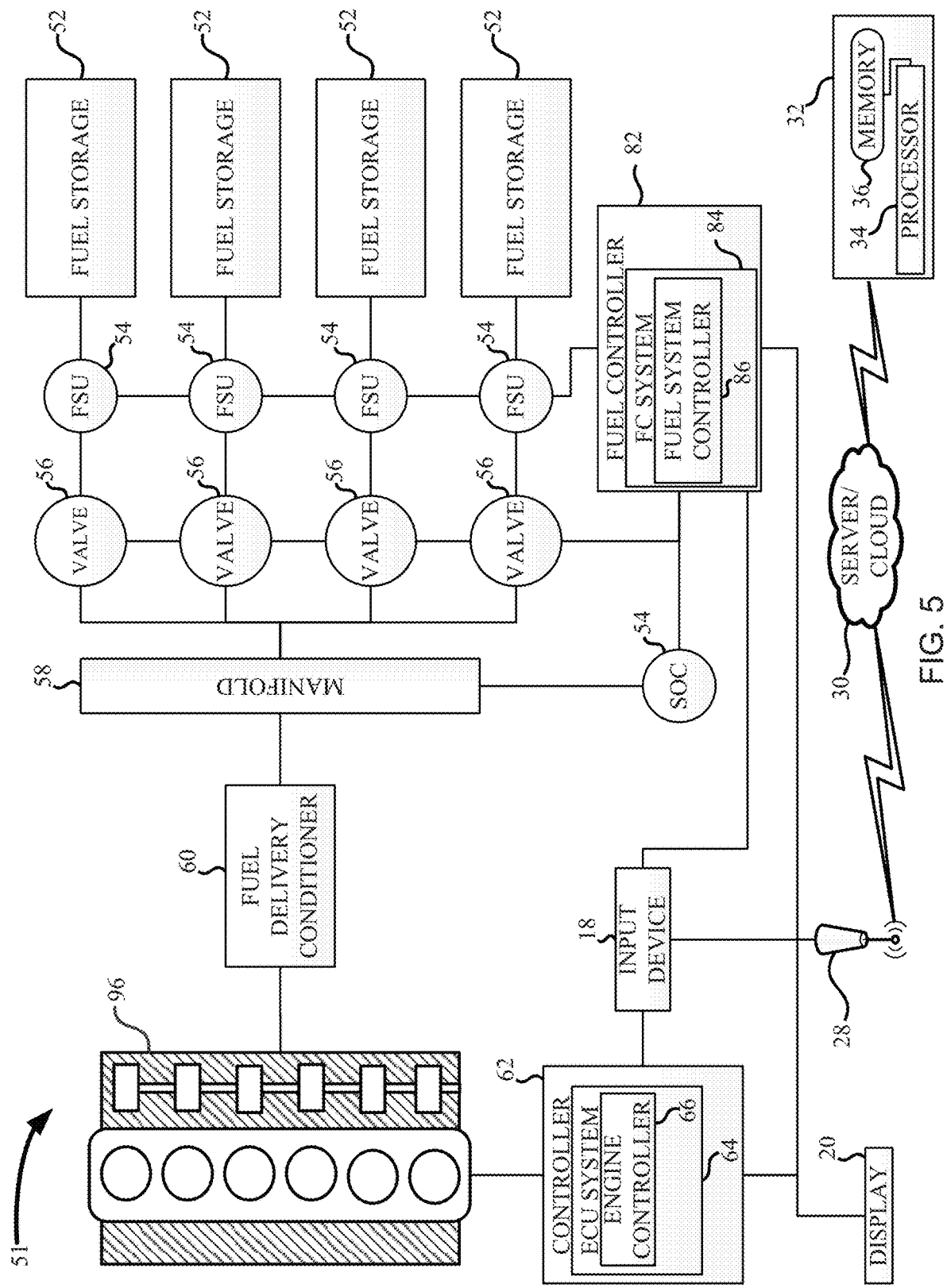
FIG. 5 illustrates an embodiment where the power plant of the vehicle is an engine, such as an internal combustion engine.

FIG. 5 exemplifies an embodiment of system 51 where the power plant is an internal combustion engine 96. Fuel storage 52 or fuel tanks may be connected to a fuel sending unit (FSU) 54, which may be connected to valves 56, which may be used to deliver fuel to manifold 58. The fuel from manifold 58 may then be supplied to internal combustion engine 96 via fuel delivery conditioner 60. Engine 96 may be controlled by engine control assembly 62, which may include engine control unit system 64, which may include engine controller 66, which may be configured to adjust the operating conditions or parameters of engine 96.

Fuel sending units 54 are not particularly limited and may include any known or herein after developed fuel sending unit. Fuel sending units 54 may include a sensing unit and/or an indicator. Sensing units of fuel sending units 54 may include various temperature, pressure, and/or floats to indicate the amount of fuel in a tank. The particular fuel sending unit 54 may vary, especially across various types of engines, such as hydrogen engines, gasoline engines, compressed natural gas engines, liquid natural gas engines, and diesel engines, and proper selection of such are within the skill of an ordinary artisan.

Also shown in FIG. 5 is fuel controller assembly 82, which may include fuel control system 84, which may in turn, include fuel system controller 86. Fuel controller assembly 82 may determine, with various inputs or data from the engine control module 62, wireless communication device 28, and input device 18, an estimated remaining distance the vehicle may operate under current and/or expected operation conditions.

In some embodiments, the processor 34 of processing unit 32 may determine how much engine performance needs to be reduced to achieve a newly desired vehicle range. This information may then be communicated to fuel controller assembly 82, which may communicate with engine controller assembly 62 to change the operating conditions or parameters of engine 96. In some embodiments, processing unit 32 may form part of the fuel controller assembly 82 or may form part of the vehicle computing system 53 (shown in FIG. 3).

While this disclosure has been described as having various exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, C, or combinations thereof" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the present disclosure should, therefore, be determined with reference to the appended claims, along with the full scope of equivalents to which such claims are entitled.

What is claimed is:

1. A method for extending a range of a vehicle comprising:
    receiving, by a processor, a first data, the first data being indicative of a distance of the vehicle from a target destination;
    receiving, by the processor, a second data, the second data being indicative of a level of potential energy of an energy source for a power plant of the vehicle;
    receiving, by the processor, an operating parameter indicative of an estimated future energy usage of the power plant,
    estimating, by the processor, an expected range of the vehicle based on the first data, the second data and the estimated future energy usage of the power plant, and adjusting, by a controller in electrical communication with the power plant, a performance parameter of the power plant to extend an actual range of the vehicle when the estimated expected range is less than the distance of the vehicle from the target destination, wherein the first data includes a route between a position of the vehicle and the target destination and a road surface roughness of the route;

wherein the estimated future energy usage of the power plant is at least partially based on a third data, the third data including historical potential energy usage of the vehicle and a weight of a payload of the vehicle, and at least one of historical potential energy usage of other vehicles, current traffic conditions, estimated future traffic conditions, current weather conditions, and future weather conditions.

2. The method of claim 1, wherein the level of potential energy is a level of a fuel.

3. The method of claim 2, wherein the fuel is at least one of an alcohol, a diesel fuel, a gasoline, a natural gas, hydrogen, propane, or mixtures thereof.

4. The method of claim 3, wherein the natural gas is at least one of compressed natural gas, liquid natural gas, or mixtures thereof.

5. The method of claim 1, wherein the level of potential energy is a state of charge of a battery.

6. The method of claim 1, wherein the power plant is an engine.

7. The method of claim 1, wherein the power plant is an electric motor.

8. The method of claim 1, wherein the operating parameter includes at least one of torque, instantaneous power, idle limits, speed, acceleration, change of acceleration, or any combination thereof.

9. The method of claim 1, further comprising instructing, by the processor, the controller to adjust the performance parameter.

10. The method of claim 9, wherein the processor communicates wirelessly with the controller.

11. The method of claim 1, wherein the first data includes at least one of a location of the vehicle, a location of the target destination, a velocity of the vehicle, an acceleration of the vehicle, an elevation change along the route, or combinations thereof.

12. The method of claim 1, wherein the target destination is a fueling station.

13. The method of claim 1, wherein the target destination is a charging station.

14. A system for extending a range of a vehicle comprising:

a controller in electrical communication with a power plant of the vehicle;

an energy source that imparts potential energy into the power plant; and a processor in electrical communication with the controller, the processor configured to:

receive a first data and a second data, the first data being indicative of a distance of the vehicle from a target destination, and the second data being indicative of a level of potential energy of the energy source for the power plant of the vehicle, estimate an expected range of the vehicle based on the first data, the second data and an estimated future energy usage of the power plant, the estimated future energy usage of the power plant based on an operating condition of the vehicle, and instruct the controller to adjust a performance parameter of the power plant to extend an actual range of the vehicle when the estimated expected range of the vehicle from the target destination is less than the distance of the vehicle from the target destination indicated by the first data, wherein the first data includes a route between a position of the vehicle and the target destination and a road surface roughness of the route, wherein the estimated future energy usage of the power plant is at least partially based on a third data, the third data including historical potential energy usage of the vehicle and estimated future traffic conditions, and at least one of historical potential energy usage of other vehicles, a weight of a payload of the vehicle, current traffic conditions, current weather conditions, and future weather conditions.

15. The system of claim 14, wherein the processor wirelessly instructs the controller.

16. The system of claim 14, wherein the power plant is an engine.

17. The system of claim 16, wherein the engine converts at least one of alcohol, diesel fuel, gasoline, natural gas, or mixtures thereof into mechanical energy.

18. The system of claim 14, wherein the first data includes at least one of a location of the vehicle, a location of the target destination, a velocity of the vehicle, an acceleration of the vehicle, an elevation change along the route, or combinations thereof.

19. The system of claim 14, wherein at least one of a location of the vehicle, a location of the target destination, a velocity of the vehicle, an acceleration of the vehicle, a route from between the position of the vehicle and the target destination, an elevation change along the route, a surface condition of the route, or combinations thereof are received wirelessly.

20. The system of claim 19, wherein the first data is stored on a cloud.

21. The system of claim 14, wherein the power plant is an electric motor and the energy source is a battery.

* * * * *